Dec. 15, 1936.　　L. R. C. COSSART　　2,064,293
ENGINE VALVE GEAR
Filed Sept. 7, 1932　　11 Sheets-Sheet 1

Léon René Camille Cossart
INVENTOR

Dec. 15, 1936.   L. R. C. COSSART   2,064,293
ENGINE VALVE GEAR
Filed Sept. 7, 1932   11 Sheets-Sheet 2
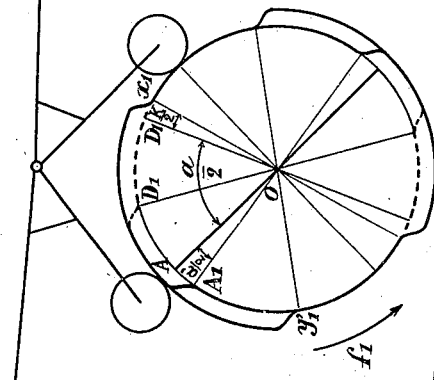
Fig. 4ᵃ
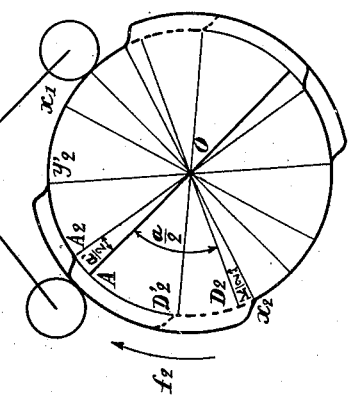
Fig. 5ᵃ
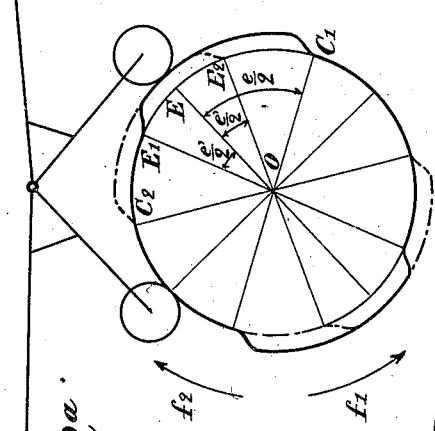
Fig. 2ᵃ
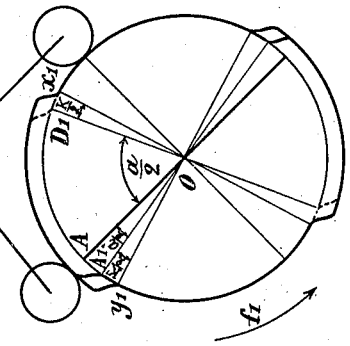
Fig. 3ᵃ
Léon René Camille Cossart
INVENTOR
his ATT'Y.

Dec. 15, 1936.    L. R. C. COSSART    2,064,293
ENGINE VALVE GEAR
Filed Sept. 7, 1932    11 Sheets-Sheet 3
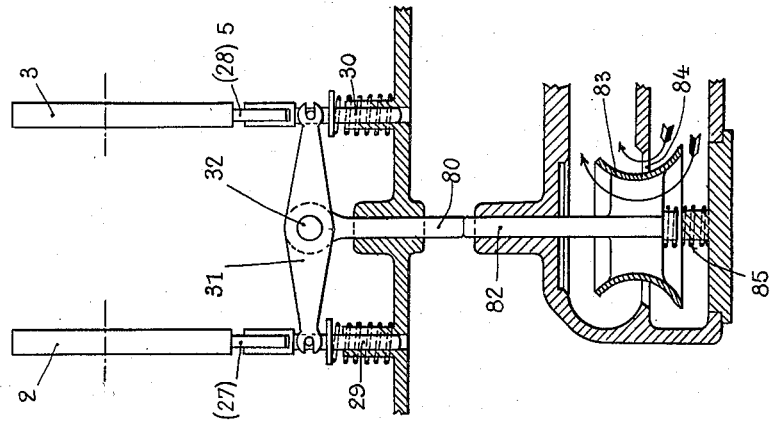
*Fig. 6*$^c$.
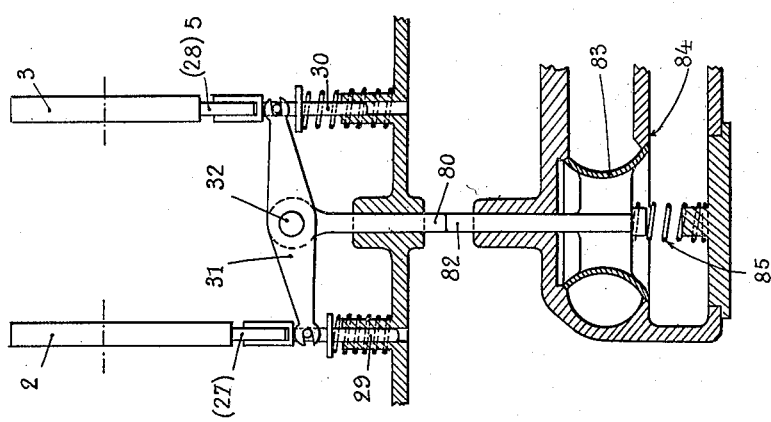
*Fig. 6*$^b$.
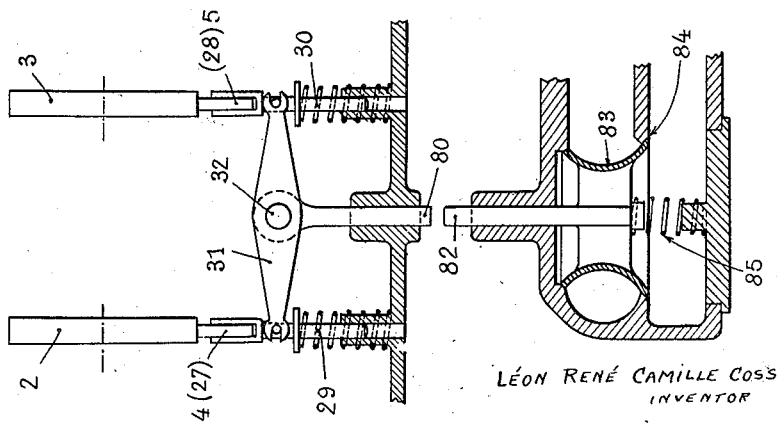
*Fig. 6*$^a$.
LÉON RENÉ CAMILLE COSSART
INVENTOR
by  *Otto Munk*
his Atty.

Dec. 15, 1936.     L. R. C. COSSART     2,064,293
ENGINE VALVE GEAR
Filed Sept. 7, 1932     11 Sheets-Sheet 4

Léon René Camille Cossart
INVENTOR:

his Attorney.

Dec. 15, 1936.  L. R. C. COSSART  2,064,293
ENGINE VALVE GEAR
Filed Sept. 7, 1932   11 Sheets-Sheet 5
Fig. 7.ª
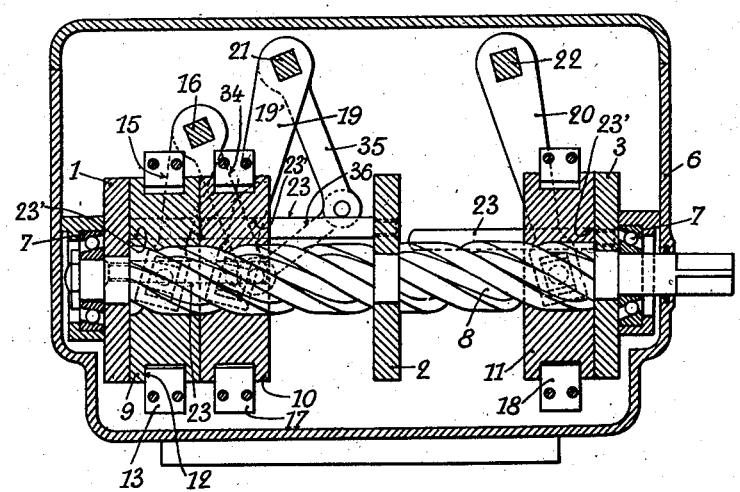
Fig. 12.ª
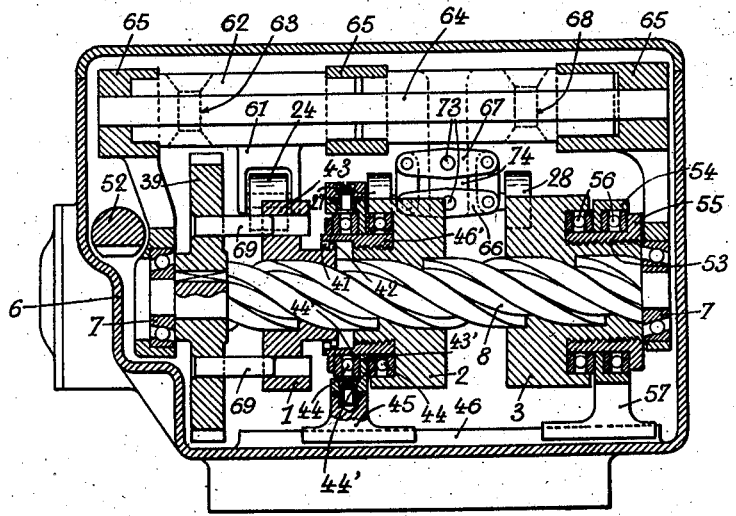
Léon René Camille Cossart
INVENTOR
his ATT'Y.

Dec. 15, 1936.    L. R. C. COSSART    2,064,293
ENGINE VALVE GEAR
Filed Sept. 7, 1932    11 Sheets-Sheet 6

Léon René Camille Cossart
INVENTOR

Dec. 15, 1936.   L. R. C. COSSART   2,064,293
ENGINE VALVE GEAR
Filed Sept. 7, 1932   11 Sheets-Sheet 7

Léon René Camille Cossart
INVENTOR
His Attorney

Dec. 15, 1936.   L. R. C. COSSART   2,064,293
ENGINE VALVE GEAR
Filed Sept. 7, 1932   11 Sheets-Sheet 8
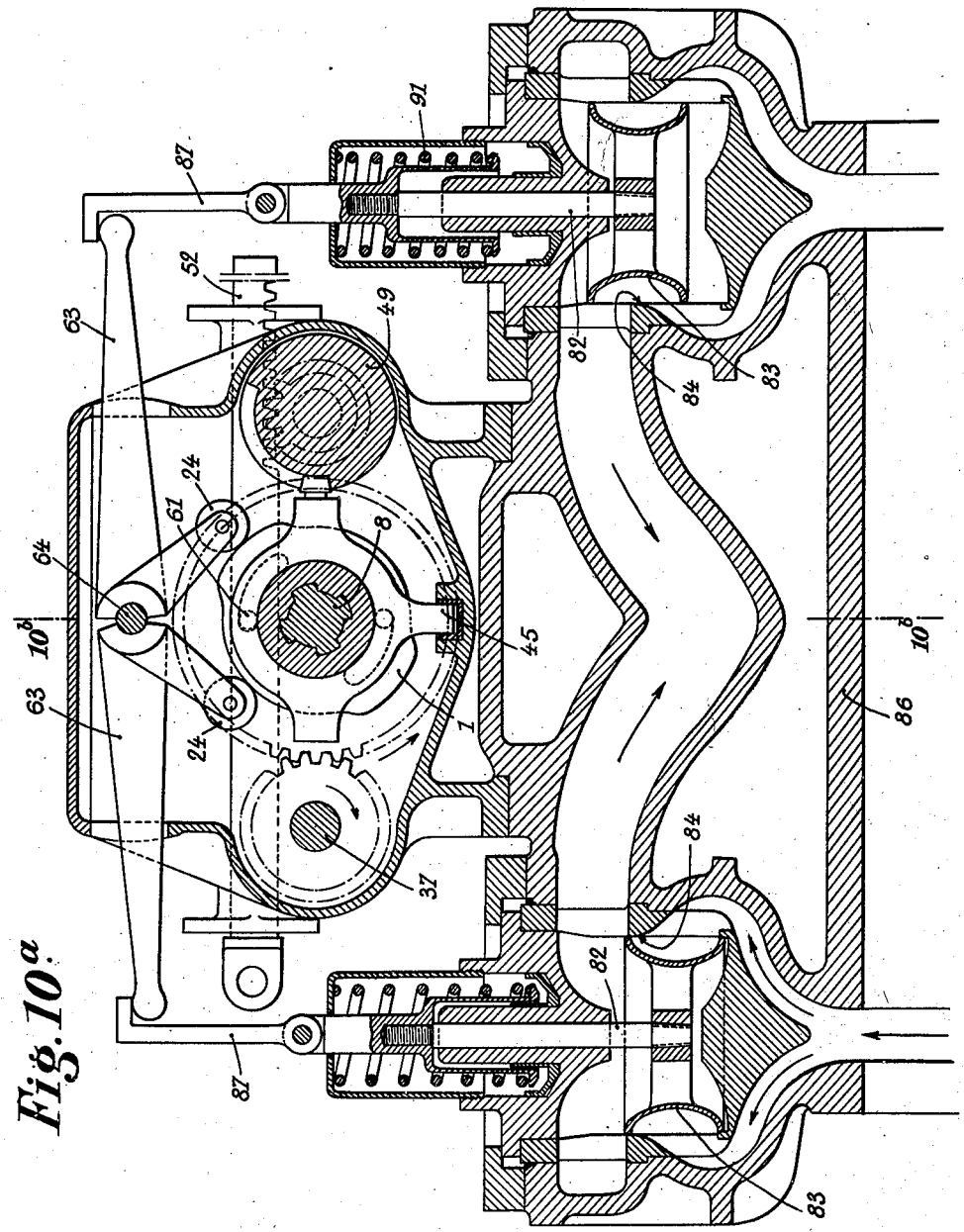
LÉON RENÉ CAMILLE COSSART
INVENTOR
by
his Atty.

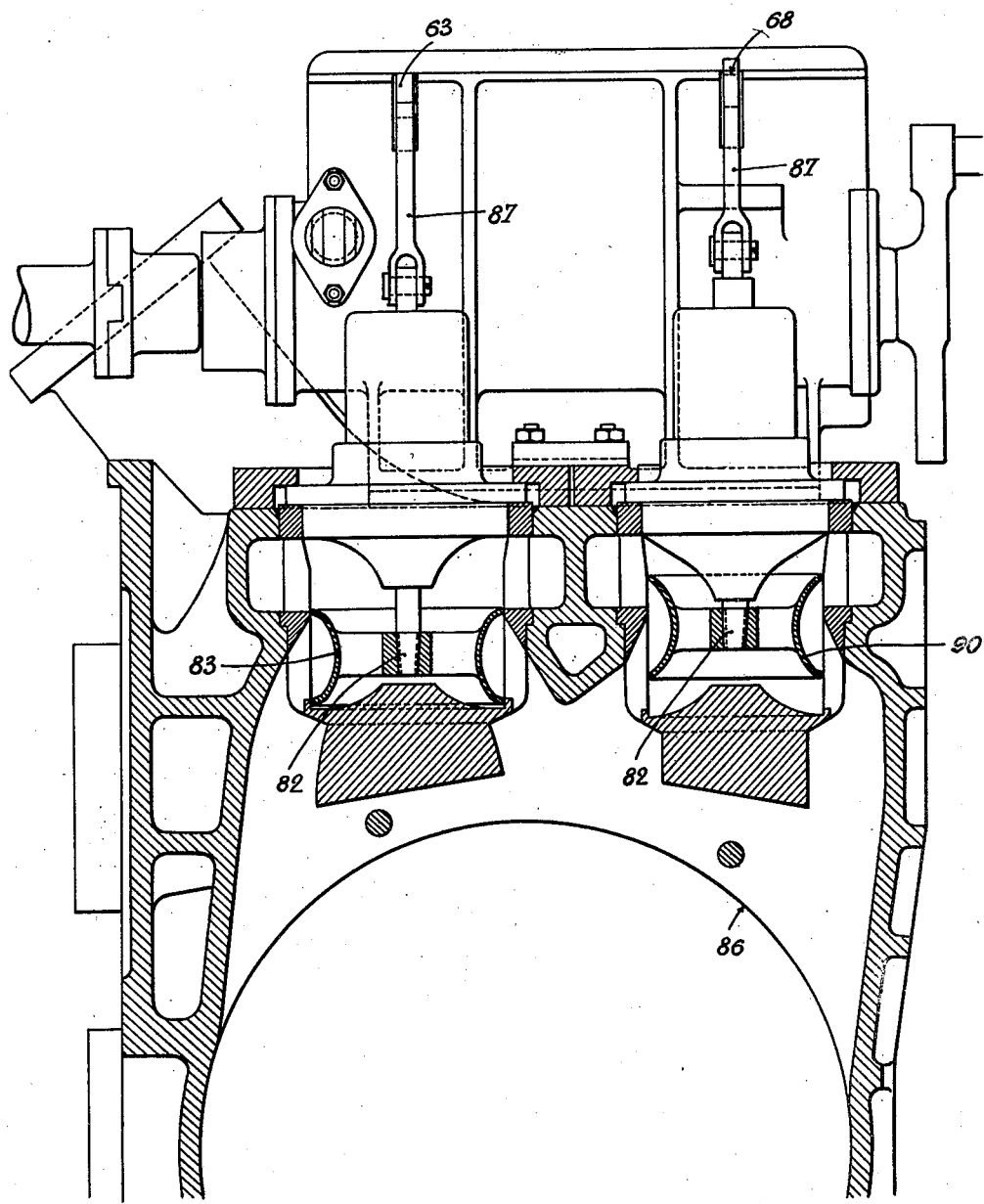

Dec. 15, 1936.  L. R. C. COSSART  2,064,293
ENGINE VALVE GEAR
Filed Sept. 7, 1932  11 Sheets-Sheet 10
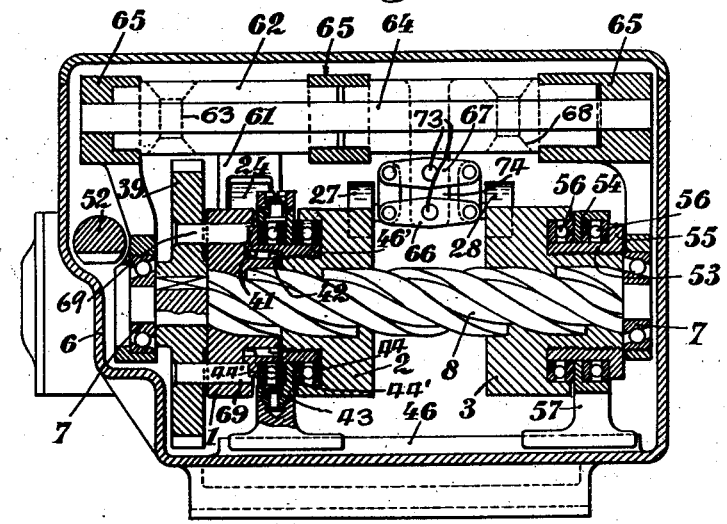
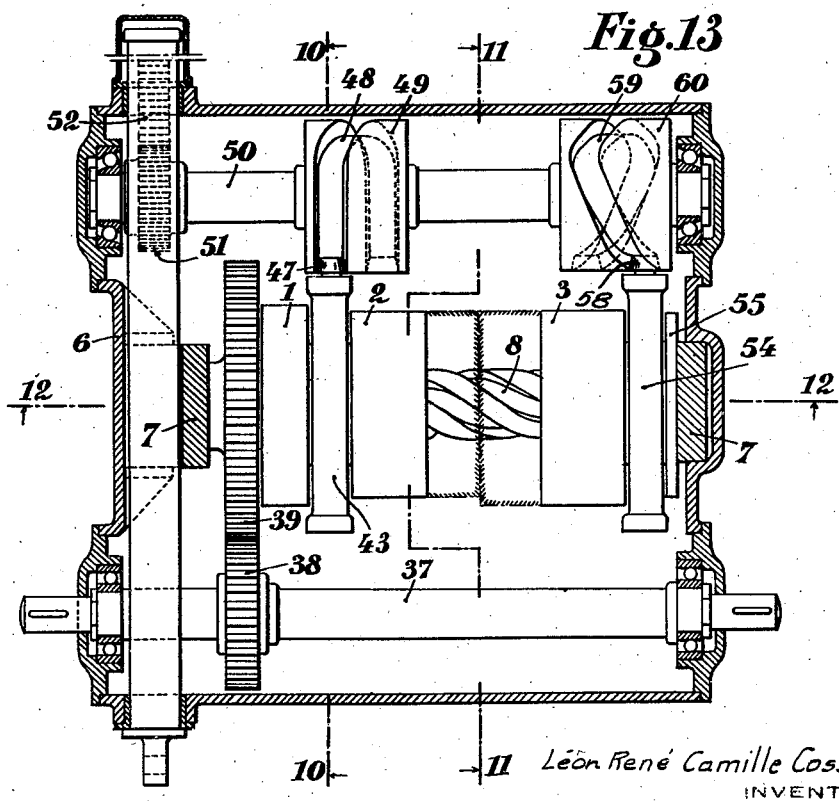
Léon René Camille Cossart
INVENTOR
his Attorney Dec. 15, 1936.   L. R. C. COSSART   2,064,293
ENGINE VALVE GEAR
Filed Sept. 7, 1932   11 Sheets-Sheet 11
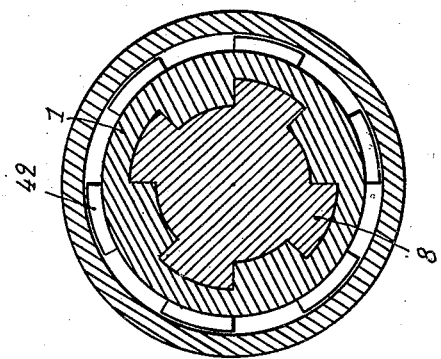
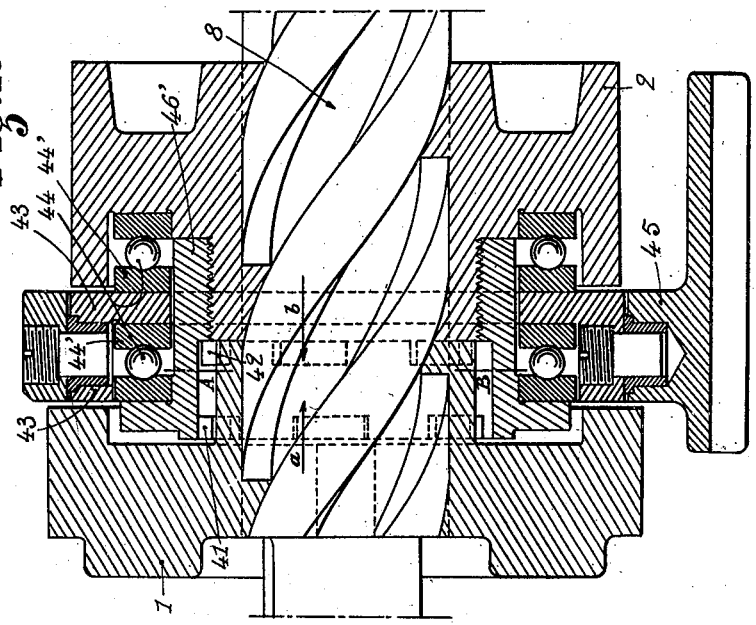
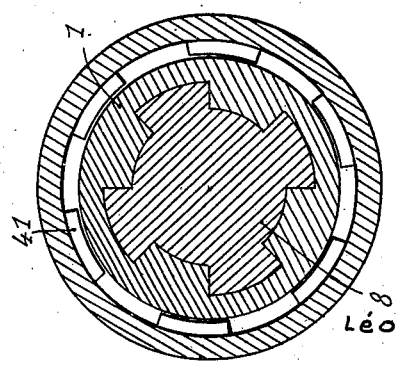
Léon René Camille Cossart
INVENTOR
By Otto Munk
his Att'y.

Patented Dec. 15, 1936

2,064,293

UNITED STATES PATENT OFFICE 2,064,293

ENGINE VALVE GEAR

Léon René Camille Cossart, Paris, France

Application September 7, 1932, Serial No. 631,957
In France September 23, 1931

5 Claims. (Cl. 121—127)

A valve gear for reversing engines must permit to reverse the running of such engines and to vary the admission period at will, irrespectively of the direction of running. Generally, these two operations are effected in intimate connection, for instance by means of slides. The reversal is realized in continuing to actuate beyond the dead centre (zero admission), the member controlling the variation of the admission.

The present invention has for its object an accurate drop valve gear for reversing engines operating upon an elastic fluid, said valve gear permitting to obtain the reversal and the variation of the admission period independently of one another; in other words the operator will have two controlling devices (levers or handwheels with worm and nut or like systems), one of them being always at the end of its stroke in either direction and serving for the reversal of the engine, it will be the "reversing device"; the other serving to vary the admission period from its maximum value to zero, in either direction of rotation of the engine, occupying thus all the intermediate positions required, this being the "expansion control device".

The valve gear according to the invention is chiefly remarkable in that it is provided with three cams, mounted on a common shaft, one of these cams controlling the opening and the closing of the exhaust (exhaust cam), the second controlling the opening of the admission (admission cam) and the third controlling the closing of the admission (expansion cam) whereby the variation of the admission period is always controlled by the angular displacement of one cam (the expansion cam) whatever the running direction may be, whereas the reversal is realized by a suitable angular simultaneous displacement of the two other cams (admission and exhaust cams).

The first two cams, which are operated simultaneously by the "reversing device", will produce the reversal of the engine, the third cam, operated by the "expansion control device", will produce the variation of the admission period.

In the accompanying drawings, which are given solely by way of example:

Figure 2:
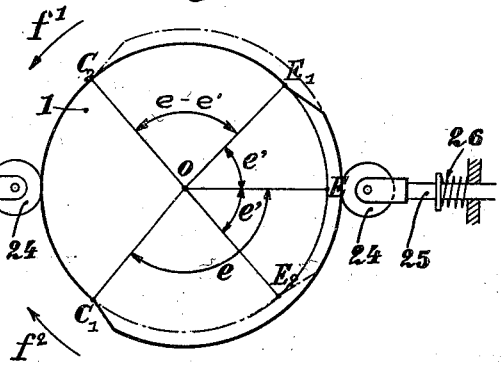
Fig. 2 is a diagrammatic elevational view of the cam controlling the exhaust valve showing the two extreme positions of this cam upon the cam shaft for both directions of running.
Figure 3:
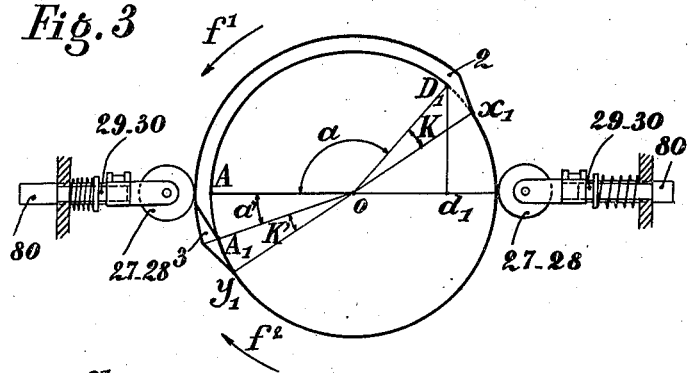
Figure 3 is a view analogous to Figure 2 showing the cams controlling the opening and closing of the admission valve for a certain degree of admission.
Figure 4:
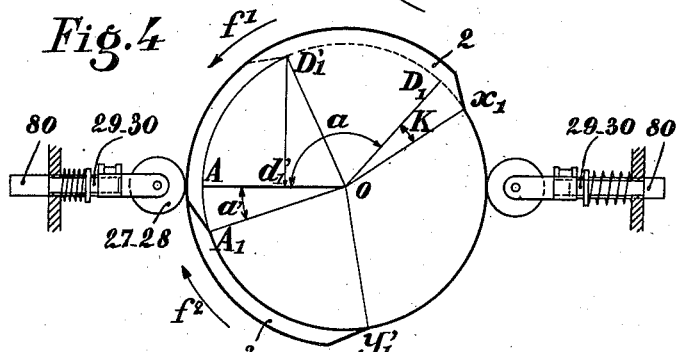
Figure 4 is an analogous view, the cams being set for another degree of admission.
Figure 5:
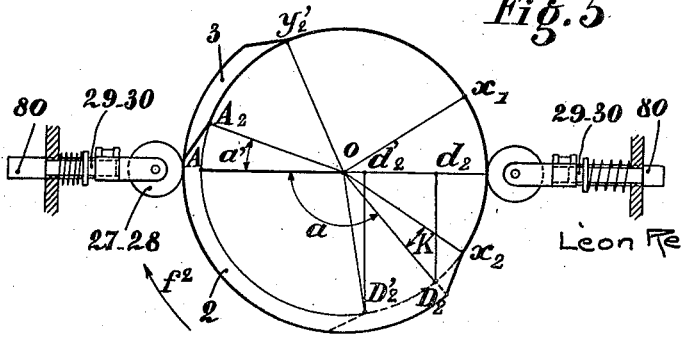
Figure 5 is a view analogous to Figure 4 wherein the cams are in position for backward running.
Figure 7:
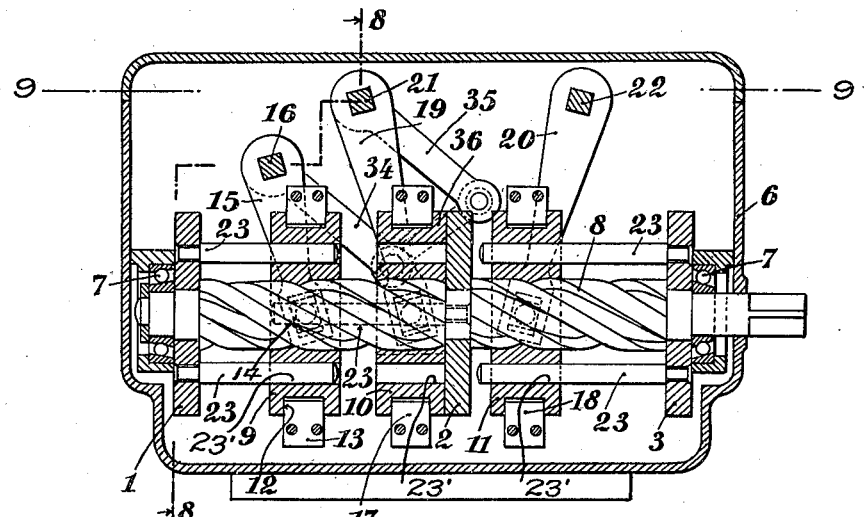
Figure 9:
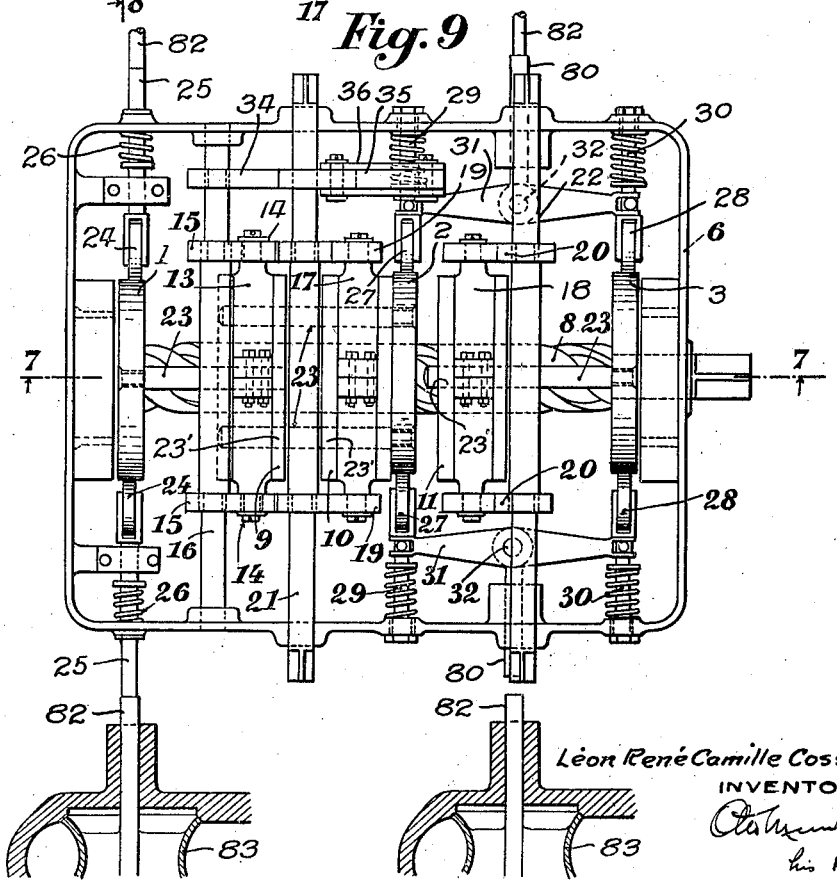
Figure 8:
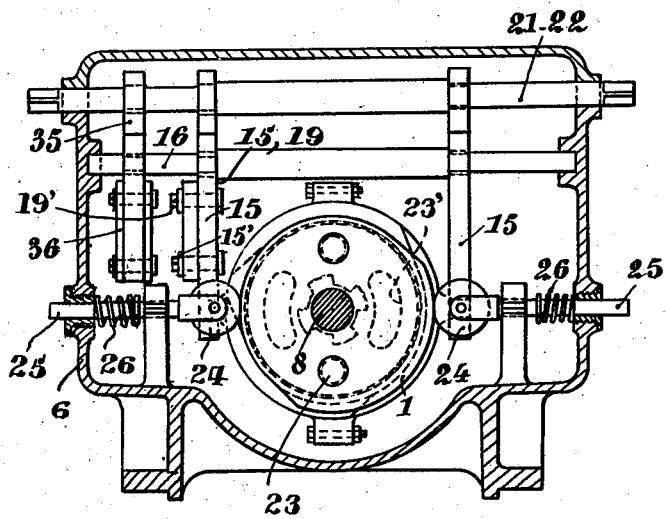
Figure 14:
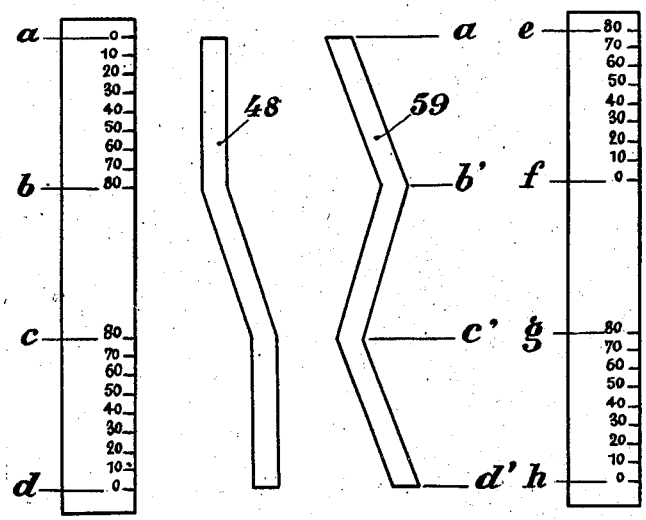
Figure 15:
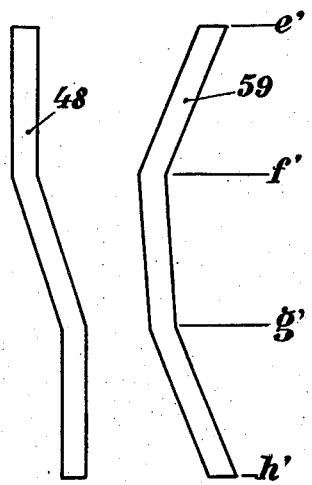
Figure 10:
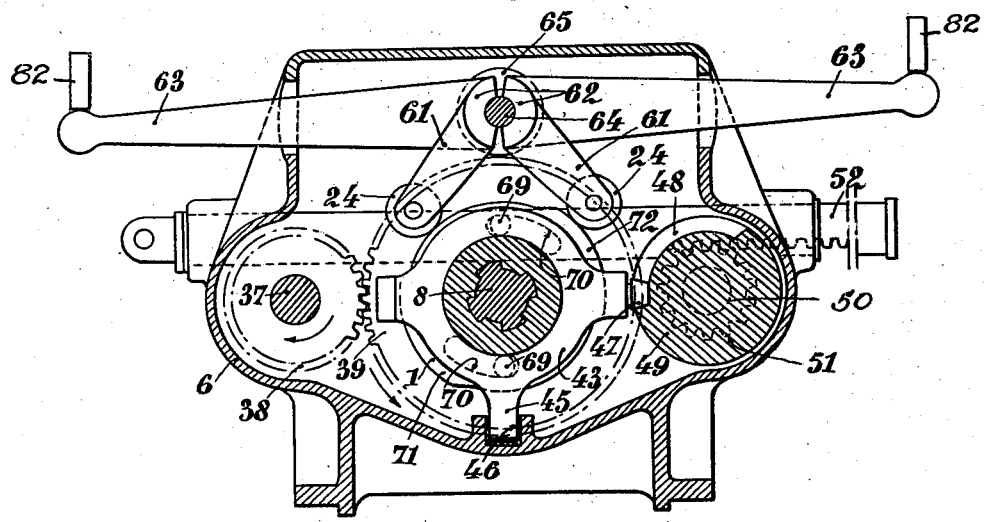
Figure 11:
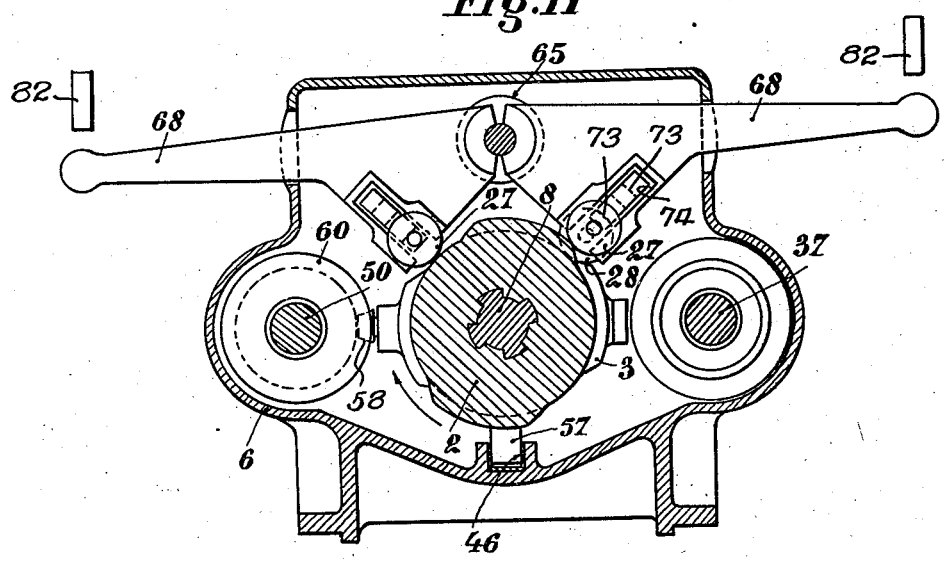

Figure 6ª is a diagrammatical end view of the expansion and admission cams cooperating with the corresponding rollers controlling together the opening and closing of the admission valve, the position of the various members corresponding to the closing of this valve;

Figure 6ᵇ is a similar view showing the position of the various members when the opening will start;

Figure 6ᶜ is a similar view showing the opening of the valve;

Figure 7 is a vertical section, on the line 7—7 of Figure 9 of a casing containing a valve gear according to the invention and in a position corresponding to the backward running with 80% admission;

Figure 7ª is a view analogous to Figure 7 wherein the gear occupies a position corresponding to forward running of the engine with 80% admission;

Figure 8 is a cross section on the line 8—8 of Figure 7;

Figure 9 is a plan view of the interior of the said casing which is supposed to be open;

Figure 2ª is a view analogous to Figure 2 showing the exhaust cam in a modified construction according to which each cam is provided with two bossages instead of one and operates upon two distinct rollers, actuating a single exhaust valve;

Figure 3ª is a view analogous to Figure 2ª showing the expansion and admission cams for a given degree of admission;

Figure 4ª is a view analogous to Figure 3ª, but for another setting of the cams;

Figure 5ª shows the expansion and admission cams during the reverse running of the engine;

Figure 10ª is a general view in lengthwise section of a constructional form of this embodiment, showing the gear and valves connected to the engine;

Figure 10ᵇ is a section of Figure 10ª on the line 10ᵇ—10ᵇ;

Figures 10 and 11 are vertical sections respectively on lines 10—10 and 11—11 of Figure 13 of an embodiment of the above mentioned modification;

Figure 12 is a lengthwise section of the same on the line 12—12 of Figure 13 and in position for forward running with 0% admission;

Figure 12a is an analogous view, the gear occupying a position corresponding to the backward running with 80% admission;

Fig. 13 is a plan view of the members contained in the said casing, the rollers and rockers controlling the valves being supposed to be removed;

Fig. 14 is a diagrammatic view, in developed position, of the grooves producing the displacement of the admission and the expansion cams with reference to the operators indicating scale;

Fig. 15 is a view analogous to Fig. 14 of grooves adapted for another governing.

Fig. 16 is a partial view on an enlarged scale of the connection existing between the exhaust and admission cams according to the constructional form of Fig. 12.

Figs. 17 and 18 are sections on the line A—B of Fig. 16 shown respectively according to the direction of arrows $a$, $b$.

Figure 1:
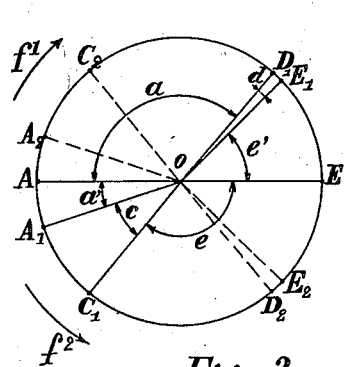
Fig. 1 is a circular diagram representing the functioning of a reversing engine operating upon elastic fluid, in both directions of running.

Referring to the diagram shown in Fig. 1, let $a'$, $a$, $d$, $e'$, $e$, $c$ be the values of the angles (Fig. 1) $A_1OA$, $AOD_1$, $D_1OE_1$, $E_1OE$, $EOC_1$, $C_1OA_1$ covered respectively by the engine crank during each of the six stages of the distribution: pre-admission, admission, expansion, pre-exhaust, exhaust, and compression, when the crank turns in the direction of the arrow $f^1$ (forward motion). During the backward motion (direction of the arrow $f^2$) just the same distribution will take place if the points $A_2$ and $A_1$, $C_2$ and $C_1$, $D_2$ and $D_1$, $E_2$ and $E_1$, are respectively symmetrical with reference to the diameter AE, the points $A^2$, $D^2$, $E^2$ and $C^2$ being the starting points of the pre-admission, of the expansion, of the pre-exhaust and of the compression periods, for the backward motion.

In a valve gear for drop valves, the angles $e'$, $e$, $c$ and $a'$ may be constant. In general, only the angles $a$ and $d$ vary. Let $a$ be the maximum value of the admission period, and $d$ the minimum value of the expansion period.

Fig. 1 shows that in forward motion (arrow $f^1$) the exhaust valve has to remain open while the crank covers the angle $E_1OC_1=e'+e$, and that in backward motion (arrow $f^2$) it should be open while the crank covers the angle $E_2OC_2=e+e'$.

The angle $E_2OC_2$ is thus equal to the angle $E_1OC_1$, but is displaced with reference to the latter by an angle $C_1OE_1=e+e'$. If it is supposed that the valves are controlled by cams rotating at the same speed as the driving shaft, it may be observed that the same cam, covering an angle $e+e'$, can serve for the same purpose in both directions of motion; in order to effect the reversal it will be necessary to bring the cam in a symmetrical position with respect to the line passing through rollers 24 and centre O. But as angle $E_2OC_2=E_1OC_1$, it will simply suffice to bring $E_1$ on $C_2$, i. e. to displace the cam by an angle $E_1OC_2=C_1OE_2=e-e'$, as indicated in Fig. 2. In this figure the cam is shown in full lines for the forward motion and in dot-and-dash lines for the backward motion.

Due to the variation of the admission period, the admission valve has to be necessarily operated by two cams; one of which, cam 2 (Fig. 3) will always afford the opening of the admission valve irrespectively of the direction of running, and will be termed as the admission cam; the other, cam 3 (Fig. 3) will always afford the closing of the admission valve irrespectively of the direction of running and will be termed as the expansion cam.

Two rollers 4 and 5 connected with the admission valve as will be further set forth, cooperate with the cams 2 and 3 (Figs. 6a, 6b, 6c). As shown in Fig. 6a the admission valve 83 is applied upon its seat 84 by spring 85 as the two rollers 4 and 5 do not move on the bosses of cams 2 and 3, and rod 80 occupies its high position. But as soon as one of the rollers (roller 4 as shown in Fig. 6b) is lowered by the boss of cam 2, rod 80 is lowered and contacts rod 82, without however pushing it down. Thus valve 83 is still closed.

Admission valve 83 will be opened only when the two rollers 4 and 5 are both on corresponding bossages of the cams 2 and 3, as shown in Fig. 6c.

The two rollers 4 and 5 have the same angular position so that their centres always remain in a common plane passing through the axis of the cam-shaft.

Fig. 1 shows that during the forward motion of the engine (arrow $f^1$) the admission valve has to open when the crank passes at $OA_1$. It is thus necessary that at this moment, the roller 4 (or 27) of the admission cam 2, should make contact with the front end of the rising ramp of this cam (Fig. 3) and that the roller 5 (or 28) of the expansion cam 3 should already be placed upon this latter cam, this requiring the rising ramp of the expansion cam to be located at a point $y^1$ which precedes $A_1$ by any angle $K'$. The valve should close when the crank passes at $OD_1$. It is thus necessary that at this moment, the roller 5 (or 28) of the expansion cam 3 should be at the end of the descending ramp of this cam, the roller 4 (or 27) of the admission cam 2 being still upon its cam during a certain time, for instance, as far as the point $x_1$, situated rearwardly of $D_1$ at any angular distance K. Thus, in order to obtain the full admission during the forward motion, it is necessary that the admission cam 2 should cover an angular amplitude $a+a'+K$ and occupy such a position that its rising ramp commences at $A_1$, whilst the expansion cam 3 should cover the angle $a+a'+K'$ and have such a position that the end of its descending ramp should be located at $D_1$. The piston stroke during the admission period, will be represented by $Ad_1$.

If the expansion cam 3 alone is angularly displaced in such manner as to bring the descending ramp at the point $D'_1$ (Fig. 4) instead of point $D_1$, without displacing the admission cam 2, the point $A_1$ will remain immovable and it is clear that the pre-admission always commences at $A_1$ and that the end of the admission takes place at $D'_1$. The piston stroke during the admission period will then be represented by $AD'_1$. It is thus observed that in order to vary the admission period, and hence the expansion period, it suffices to angularly displace the expansion cam 3 without changing the position of the admission cam 2.

The expansion cam remaining in the position shown in Fig. 4, let the admission cam 2 be displaced by an angle $a+K-a'$, the point $x_1$ coming at $A_2$ (Fig. 5). This simple displacement of the admission cam alone reverses the direction of running. In fact, as the crank now turns in the direction of the arrow $f^2$ (Fig. 1), the roller 4 (or 27) of the admission cam 2 meets the rising ramp of this cam at a moment when the crank passes at $OA_2$, whilst the roller 5 (or 28) of the expansion cam 3 is already upon its cam since the crank has passed at $oy'_2$ and the valve is closed when the crank passes at $OD'_2$. The piston stroke during the admission period is then represented by A$d'_2$. Leaving the admission cam 2 in the position A$_2x_2$, one may vary the angular position of the expansion cam so as to give to the descending ramp D'$_2$ all positions from D$_2$ (maximum admission) to A (zero admission), and consequently obtain for the backward motion all the admission periods from A$d_2$ to O.

The reversal will be realized by the simultaneous angular displacement of the admission cam 2 and exhaust cam 1, the former by an angle $a+K-a'$, the second by an angle $e-e'$. The variation of the admission and hence of the expansion periods, will be obtained, irrespectively of the direction of running, by the simple angular displacement of the expansion cam 3.

The operator thus will have at his disposal, as above stated, two controlling devices (not shown): (lever or hand-wheel with worm and nut or any other system), one of these devices, will always be at the end of its stroke in one or the other direction and will serve for the simultaneous angular displacement of the admission cam by the angle $a+K-a'$ and of the exhaust cam by the angle $e-e'$, this device being the "reversing device"; the other device will serve exclusively for the displacement of the expansion cam, and it may assume all positions necessary for varying the admission at will, in either direction of running, from 0° to the angle $a$, this device being the "expansion control device". This latter device will be provided with two graduated scales, respectively for the forward and backward runnings.

A first form of construction of a valve-gear in conformity to the invention has been represented in Figs. 7 to 9. In this example of construction, a casing 6 contains and supports by ball-bearings 7 a shaft 8 which is parallel with the engine shaft and turns at the same speed as the latter. The shaft 8 has, upon its whole length the form of a multiple-thread screw of very large pitch (Fig. 7), the pitch being selected in order to reduce the reactions upon nuts 9, 10 and 11 which are adapted for lengthwise motion and rotation on this shaft.

The nut 9 is provided on its periphery with an annular groove 12 adapted to receive a collar 13, composed of two parts which are held together for instance by bolts. The width of the groove is equal to that of the collar, which penetrates in said groove, so that there is no lateral play of the said collar 12 in the nut 9.

The collar 13 carries journals 14 (Figs. 8 and 9) upon which are pivotally mounted two links 15 having the symmetrical position with reference to the vertical plane passing through the axis of the shaft 8. These links are keyed on a shaft 16 which is perpendicular to the shaft 8 and is pivotally mounted in the box 6.

In like manner, the other two nuts 10—11 are fitted with collars 17 and 18 which are connected by links 19—20 with shafts 21 and 22 parallel with the shaft 16.

Upon the longitudinal shaft 8 are loosely mounted three cams 1, 2, 3, controlling respectively: cam 1, the opening and closing of the exhaust valve, cam 2, the opening of the admission valve, and cam 3, the closing of the admission valve.

On either of these cams are secured, for instance by screwing, suitable studs 23 (Figs. 7 and 9) engaging holes in the said nuts 9, 10 and 11. The exhaust cam 1 will thus be connected for rotation with nut 9, while the admission cam 2 is connected for rotation with nut 10, and the expansion cam 3 with nut 11.

In order to permit the shifting to the left of nuts 9 and 10, from the position shown in Fig. 7 to the one shown in Fig. 7$^a$, nuts 9 and 10 are provided with suitably elongated holes 23' (Figs. 7, 7$^a$, 8) affording the passage of studs 23 and a relative rotation of one cam with respect to the other.

A roller 24 (Figs. 8 and 9), mounted on a rod 25, which is slidable in the casing 6 and controls the exhaust valve, is urged against the cam 1 by a spring 26. In the same way, on each cam 2 or 3 bear by means of a spring respective rollers 27 and 28 mounted on rods 29 and 30. The rods 29 and 30 are connected together by a rocking arm 31 whose middle point 32 controls the admission valve by means of a push-rod 80.

The two rods 29—30 and the two rollers 27—28 are disposed in such a manner that the axes of these two rollers are always located in a common plane passing through the axis of the cam shaft. With this arrangement (Figs. 6 and 9), the displacement of the middle point 32 of the rocking lever 31, controlling the valve, will always be equal to half the sum of the displacements of the axes of the rollers, and the point of action of the ramps of the cams 2 and 3 will undergo no variation affecting the theoretically designed distribution. Means will be provided for obtaining a lost motion between the push-rod 80 and the valve stem of approximately one-half the distance of the lift of the cam in order that the valve will be opened only when the rollers are on both of the high surfaces of the cams 2 and 3. The control of the admission and the exhaust valves is effected by imparting to the valve rods 82, by any mechanical means (by rockers, as shown in the drawings) the motion of the rollers moving on the cams. As represented the rockers 31 are pivoted at their middle at 32 on a slidable push rod 80 acting upon the valve rod 82. Between these two rods, a lost motion of one half the lift of the cam is provided in order to permit rod 82 of being actuated only after both of the rollers 27 and 28 have been lifted by the corresponding cams 2 and 3.

In order to obtain the simultaneous rotation of the exhaust cam 1 by an angle $e-e'$ and of the admission cam 2 by an angle $a+K-a'$, it will suffice to provide links 15 and 19 the lengths of which are proportional to $e-e'$ and to $a+K-a'$, and to connect said links by another link. But, in order to prevent a pushing action, due to an excessive inclination of such an auxiliary link, the shafts 16 and 21 preferably carry two keyed links 34 and 35 of the same length which are connected together by a link 36, the two links 34—35 being perpendicular to the plane containing the axis 16 and 21, when the nuts are in their mean position, that is when the links 15—19 are vertical.

Now it suffices to realize the reversal to rotate one of the shafts 16 or 21 through the desired angle, in order that the other thereto connected shaft may turn through the same angle, as there is a jointed parallelogram formed by pieces 15, 19, 33. At the same time, the nuts 9 and 10 move lengthwise under the action of the links 15—19, rotating on the shaft 8. This movement is rendered possible either by the provision of a sufficient clearance between the nuts and the respective collars or by the provision of a play at the point where the links 15 and 19 are pivoted upon the collars. These nuts rotate the respective cams 1 and 2 through angles proportional to the lengthwise displacements of these nuts, said displacements being at their turn proportional to the lengths of the links 15—19, hence to the angles $e-e'$ or $a+K-a'$. The control of the expansion cam 3 for varying the admission period will be effected by rotating the shaft 22 through the desired angle, thus affording a determined angular displacement of the cam 3.

It is to be noted that the ends of the links 15—19—20 describe circular arcs and not straight lines parallel with the axis of the shaft 8. It is thus necessary either to provide between the bottom of grooves 12 of nuts 9—10—11 receiving the collars and the inner surfaces of these collars a sufficient clearance or a play or slots at the pivots of the links 15 and 19 as explained above.

For the control of the admission and the exhaust valves situated at the other end of the cylinder, it suffices to provide symmetrically, with reference to the vertical plane passing through the shaft 8, a system of rollers 24—27—28, a rocking arm 31 and an arrangement for imparting the motion to the valves. When it is desired to obtain the reversal it will simply suffice to bring the links and other elements, by a suitable rotation of shafts 16 or 21, into a position corresponding to the one shown on Fig. 7a and corresponding to the forward running with the same percentage of admission.

It is to be noted that for a given pitch of the screw 8, the displacements of the nuts 9—10—11 will be proportional to the angles by which the cams 1—2—3 are displaced, and, consequently, the general size of the casing 6 will depend upon the sum of these angles, which are determined by the distribution to be obtained. Obviously these angles may be diminished by reducing in a ratio of $$\frac{1}{2}$$

the speed of rotation of the cam shaft relatively to the rate of rotation of the driving shaft. In fact, if the speed of the cam shaft is $$\frac{1}{2}$$

the speed of the driving shaft, it will suffice to space, equally, upon the circumference 2 cams the angular length of either of them being $$\frac{1}{2}$$

the theoretical angular length, by keying the rollers, controlling the valves situated at the opposite ends, at a distance of $$\frac{180°}{2}$$

apart. The angular lengths of the cams being thus reduced in ratio $$\frac{1}{2}$$

the setting angles will be reduced in like manner, as well as the lengths of displacement of the nuts. The Figures 2a to 5a show in a diagrammatic way the different positions of the cams and rollers in this kind of device. Each cam is provided with two bossages so that the camshaft may be rotated at half the speed of the driving shaft, the functioning of the engine being the same as herein before described. If it is necessary to reduce still more the speed of the camshaft, a number $n$ of bosses may be provided on the cams.

Fig. 2a shows the position of the two rollers controlling the exhaust, one of these rollers travelling upon a bossage, the other one being on the flat part of the cam. The angular extension of each bossage is of 90°. Figs. 3a to 5a show the cams controlling the opening and the closing of the admission valve. The operation of these rollers and cams as well as the numeral references on these figures are the same as on Figures 3–5. The lefthand pairs of rollers in Figs. 3a to 5a are represented at the moment when the admission period begins. This period is determined by the angular extension of the superposed portion of the two bossages on the two cams. Thus in Fig. 3a this portion is relatively large and substantially corresponds to angle $A_1OD_1$. In Fig. 4a, this portion also corresponds to angle $A_1OD_1$. The rotation of the cams being effected in the direction of arrow $f_1$, the rollers will occupy a symmetrical position with respect to diameter $y'_1O$ or $y_1O$ after half a revolution of the cams. Fig. 5a shows the case when the rotation is inverted and affects the direction of arrow $f_2$. In this case the superposed portion of the bossages is equal to $D'_2OA_2$.

In Figs. 10, 10a, 10b, 11, 12, 12a, 13, 16, 17 and 18 is shown a constructional form of a valve gear according to the invention, said valve gear being of design complicated by a device permitting the driver to handle but a single controlling member, and another device by which the cam shaft can be rotated at half the speed of the driving shaft.

According to this embodiment and as shown in Figs. 10a and 10b, the engine cylinder 86 is provided with two exhaust valves 83 (Fig. 10a) which are supported by rods 82, which may contact and be lifted by rockers 63 against the action of springs 91. These rockers are controlled by the engine driven cam shafts in the manner shown in a more detailed way in Figs. 10, 11 and 12 and as described below.

The admission valves 90 (Fig. 10b) are also supported by rods 82 which are actuated by corresponding rockers 68 in a similar way.

The casing 6 contains and supports by ball bearings three shafts 8, 37 and 50, which are parallel with the driving shaft. The shaft 37 is actuated by the driving shaft and rotates at the same speed as this shaft; it carries a gear wheel 38 meshing with a gear wheel 39, of double the diameter, keyed on the shaft 8. The shaft 8 is rotated at half the speed of the driving shaft. This shaft 8 forms, upon its whole length, a screw with multiple threads of a very large pitch. The three cams (1 for the exhaust, 2 for the admission, 3 for the expansion) form themselves nuts upon this shaft 8.

On the admission cam 2 is laterally screwed a sleeve 46' (Fig. 12) provided with projections 41, adapted to make contact with arms 42, of the exhaust cam 1. The engagement of these arms 41 and 42 is of the bayonet type. A suitable axial play is allowed between the arms or studs 41 and 42, so that they will make contact and one of the cams 1 or 2 will be moved by the other, only when the first has effected a part of its stroke.

As shown on Figs. 17 and 18 the device comprises 6 arms, each one having an angular length of $$\frac{180°}{6}=30°.$$

The whole rotation of one cam with respect to the other being in this case:

$$x=\frac{(a-a')}{2}-\frac{(e-e')}{2}$$

it will suffice in order to always prevent arms 41 and 42 of passing by each other to have $x$ inferior or equal to 30°. Should $x$ be superior to 30° it will be necessary to adopt a construction with 4 arms 41 and 42 and to have $x$ inferior or equal to 45°.

Between the cams 1 and 2, a collar 43 is mounted loose on the sleeve 46' by means of ball-bearings 44, 44'. This collar is guided so as to avoid any rotation and carries, for this purpose, an appendage 45 (Figs. 10 and 12) sliding in a longitudinal groove 46, situated in the bottom of the casing 6. On the other hand, this collar 43 bears without clearance, upon plates 44' in order to displace during its movement and parallel with the cam shaft the sleeve 46', hence the cam 2.

Figs. 16 to 18 still more clearly show the arrangement of these parts, whereas Fig. 12a shows the position of the mechanism for the backward running with 80% admission.

It is obvious that by moving the collar 43 in a direction parallel to the axis of the cam shaft by a given length, determined by the pitch of the screw, the cam 2 may be rotated by an angle $a+K-a'$, and that by giving to the play existing between the arms 41 and 42 a value corresponding to the difference between the angles $a+K-a'$ and $e-e'$, the cam 1 will be displaced only after the cam 2 has been rotated through an angle $(a+K-a')-(e-e')$. It results therefrom that the cam 1 will rotate only through the angle $e-e'$. It will thus suffice to connect the collar 43 by any suitable mechanical means with the "reversing device" used by the operator, in order to enable the latter, when turning it through its full stroke in one or the other direction, to displace simultaneously the cam 2 by the angle $a+K-a'$, and the cam 1 by the angle $e-e'$.

In like manner, upon the cam 3 (expansion) is laterally screwed a sleeve 53 (Fig. 12) upon which is loosely mounted a collar 54, held between the cam 3 and a flange 55 of said collar by means of ball-bearings 56. This collar 54 also carries an appendage 57 which is slidable in a groove 46, thus held against rotation.

By connecting this collar 54 by any suitable mechanical means with the aforesaid "expansion control device" of the operator, the latter may vary at will the angular position of the cam 3, hence the instant of closing of the admission valve.

By way of example, the represented apparatus comprises a combination due to which the operator will have but a single controlling device. This combination consists of a shaft 50 carrying drums 49 and 60. Respective grooves 48 and 59 of a particular shape are formed in these drums. In the grooves 48 is movable a roller 47 mounted on the collar 43 controlling the exhaust cam 1 and the admission cam 2; in the groove 59 is movable a roller 58 mounted on the collar 54 controlling the expansion cam 3. The shaft 50 carries a gear wheel 51 meshing with a rack 52 which is slidable in the casing 6. It is set in motion by the operator, and permits of turning the shaft 50 through 360°, hence to change at will the position of the cams 1, 2 and 3.

In Fig. 14, the said grooves 48 and 59 of the drums 49 and 60 are laid out in a plane. It is observed that when the drums are in the position for which the rollers 47 and 58 are upon the line $a\ a'$, the valve-gear will provide for the forward running with zero admission. During the rotation of the drums, the grooves 48 and 59 will be displaced with reference to the rollers 47 and 58, until they arrive at $b\ b'$. During this time, the groove 48 being in a plane perpendicular to the axis of the shaft 50, the roller 47 is stationary, the cams 1 and 2 are immovable, but the expansion cam 3 takes all positions for an increasing admission, up to the maximum admission. From $b\ b'$ to $c\ c'$ the reversal takes place. (Fig. 12 corresponds to a position $b-b'$ of Fig. 14.) The roller 47, which slides in the inclined part of the groove, displaces the admission cam 2 which turns through the angle $a+K-a'$, and the cam 2, after taking up the play between the arms 41 and 42, displaces at its turn the exhaust cam 1 which turns through the angle $e-e'$.

During this time and due to the form of the grooves 59, the expansion cam 3 takes the position for the maximum admission on backward running. The operator should never allow his device to remain in a position between $b\ b'$ and $c\ c'$. From $c\ c'$ to $d\ d'$, the admission and the exhaust cams do no longer move and the expansion cam 3 is placed successively in all the positions in order to vary the admission from the maximum to 0, on backward running. It is evident that different combinations may be obtained by varying the forms of the grooves 48 and 59, for instance the combination shown in Fig. 15 wherein the grooves 48 and 59 are such that the admission is maximum at $e-e'$ and diminishes up to $f-f'$. The part $g-g'$ to $h-h'$ is analogous to that limited by $c-c'$ and $d-d'$.

It is to be noted that, in its position for the backward motion (Fig. 12a), the exhaust cam 1, bearing no longer upon the gear wheel 39, as during the forward motion, and being only held during the running in one direction by the arms 41 and 42, might participate in this movement in a certain direction of rotation of the cam shaft 8. To prevent such rotation, two arms 69, carried by the gear wheel 39, slide in bores 70 provided, in the exhaust cam 1, drive and maintain it in its position for backward motion, by bearing upon the outer ends of the bores. Obviously the length of each bore 70 is equal to $$\frac{(e-e')}{2}$$

Two rollers 24 bear on the exhaust cam 1, which is provided with two bossages 71 and 72 (the cam shaft rotating at half the speed of the driving shaft) (Figs. 10, 12 and 12a), said rollers being spaced at 90° on the periphery of the cam (Fig. 10, and also Fig. 2ª). These rollers control the exhaust valves of the two ends of the cylinder. Each roller 24 is mounted loose in a forked member 61 mounted on a semi-cylindrical member 62 secured to a lever 63 acting on the valve rod. The two members 62 partially surround a pin 64 upon which they can oscillate and their ends are located in sleeves 65 by which they are held against the said pin.

In like manner, two rollers 27—28 bear upon either the admission cam 2 and the expansion cam 3 provided with two bossages (Figs. 3ª to 5ª), the roller 27 bearing upon cam 2 and roller 28 upon cam 1; these rollers are spaced by 90° on either cam (Figs. 11 and 12), and control the admission valves at the two ends of the cylinder, by means of the following device.

The rollers 27 and 28 corresponding to the respective admission valves have their axes situated in a common plane passing through the axis of the cam shaft 8. These axes are connected together by a rod 66 forming one side of a jointed parallelogram. Rod 66 and the opposite side 67 of the parallelogram are pivoted, at their middle point 73, in a fork 74 provided in a rocker 68, mounted in the same manner as the rockers of the exhaust valve upon the same shaft 64. The other two rollers 27 and 28 spaced at 90° from the preceding controlling the other admission valve are mounted, in like manner, upon the second rocker 68.

Having now described my invention what I claim as new and desire to secure by Letters Patent is:

1. In a valve gear for reversible engines, valve actuating means consisting of rollers and levers, a cam shaft, three cams mounted on said camshaft, angularly movable thereon and actuating the respective valves by means of said valve actuating means, one of these cams (exhaust) controlling the exhaust valve, the second cam (admission) controlling the opening of the admission for both directions of running, and the third cam (expansion) controlling the cut off of the admission, whatever the direction of running may be, said valve actuating means for the admission valve being responsive to the combined action of the admission and expansion cams, means for the control of the variation of the admission period by displacing solely the expansion cam whatever the direction of running may be and means providing for the reversal in directions of running by simultaneously displacing the admission and exhaust cams.

2. A valve gear as claimed in claim 1, wherein said valve actuating means embody rollers engaging the respective cams, the rollers moving upon the admission and expansion cams being substantially parallel and adjacent, and connected together, their axis remaining constantly in a common plane passing through the axis of the cam shaft.

3. A valve gear as claimed in claim 1, in which a single collar is provided assuring the displacement of both the admission and exhaust cams, suitable studs of the bayonet type for connecting said cams together, a sufficient axial clearance with respect to the cam shaft being provided between said studs of the two cams in order to cause one of these cams to move with respect to the other, before these studs make contact and set the second cam in motion.

4. In a valve gear for reversible engines, valve actuating means consisting of rollers and levers, a camshaft, three cams mounted on said camshaft angularly movable thereon and actuating the respective valves by means of said valve actuating means, one of these cams (exhaust) controlling the exhaust valve, the second cam (admission) controlling the opening of the admission for both directions of running, and the third cam (expansion) controlling the cut off of the admission, whatever the direction of running may be, said valve actuating means for the admission valve being responsive to the combined action of the admission and expansion cams, means for the control of the variation of the admission period by displacing solely the expansion cam whatever the direction of running may be, means providing for the reversal in both directions of running by simultaneously displacing the admission and exhaust cams and further common actuating means for operatively connecting said reversing means and said admission control means, embodying a shaft adapted to be operated by the driver, and cam members keyed to said shaft, said reversing means cooperating with one of said cam members and the admission control means cooperating with the other cam member.

5. In a valve gear according to claim 4, a drum carrying said cam members, collars slidably mounted upon said cam shaft, and connected with said cams as to axial displacement, and guiding means on said collars slidably engageable with said cam members and obliging said collars to move upon the camshaft and to drive the cams in order to give them the desired angular setting.

LÉON RENÉ CAMILLE COSSART.